US007519551B2

(12) United States Patent
Bent et al.

(10) Patent No.: US 7,519,551 B2
(45) Date of Patent: *Apr. 14, 2009

(54) SYSTEMS AND METHODS FOR ADMINISTERING RETURN SWEEP ACCOUNTS

(75) Inventors: Bruce Bent, Manhasset, NY (US); Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 785 days.

This patent is subject to a terminal disclaimer.

(21) Appl. No.: 10/071,053

(22) Filed: Feb. 8, 2002

(65) Prior Publication Data

US 2002/0091637 A1 Jul. 11, 2002
US 2006/0212389 A2 Sep. 21, 2006
US 2008/0046361 A2 Feb. 21, 2008

Related U.S. Application Data

(63) Continuation-in-part of application No. 09/176,340, filed on Oct. 21, 1998, now Pat. No. 6,374,231, and a continuation-in-part of application No. 09/677,535, filed on Oct. 2, 2000.

(51) Int. Cl.
*G06Q 40/00* (2006.01)

(52) U.S. Cl. .......................................... 705/35; 707/1
(58) Field of Classification Search .................. 705/30, 705/35, 38–40, 42; 707/1, 10, 100–104; 902/24, 41
See application file for complete search history.

(56) References Cited

U.S. PATENT DOCUMENTS 4,232,367 A 11/1980 Youden et al.
(Continued)

FOREIGN PATENT DOCUMENTS

JP 10049590 2/1998
(Continued)

OTHER PUBLICATIONS

Womack, EFT '99 Spawns Methods for Reaching the "unbanked", Jun. 1998, Bank Marketing, v30n6, pp. 8-11, ISSN: 0888-3149.*

(Continued)

*Primary Examiner*—Mary Cheung
(74) *Attorney, Agent, or Firm*—Foley & Lardner LLP

(57) ABSTRACT

Novel systems and methods for managing a plurality of client demand accounts so as to allow a banking institution to retain client deposits on the bank's balance sheets while, at the same time, providing the client with the capability of implementing up to an unlimited number of transactions per month and also providing the client with interest on their account balances. These objectives are achieved through the use of a pooled deposit account at the client's savings institution or bank. Funds are transferred from individual client demand accounts to the pooled insured deposit account. All or a portion of the interest accrued from the pooled deposit account is then distributed to individual clients. The interest may, but need not, be distributed according to the relative proportions of each client's funds in the pooled deposit account. A database keeps track of deposits to, and withdrawals from, each of the client demand accounts, as well as each client's proportionate and/or monetary share in the pooled deposit account. On a regular, periodic, or recurring basis, a net transaction is calculated as the sum of individual client deposits and withdrawals from the plurality of demand accounts. The net transaction calculation is used to determine an amount of funds that need to be deposited into the pooled deposit account to cover client deposits, or an amount of funds that needs to be withdrawn from the pooled deposit account to cover client withdrawals. Individual account management calculations are performed to determine whether to deposit or withdraw funds from the pooled deposit account to each of a plurality of individual client demand accounts. The database is updated for each client's deposit and withdrawal activities. The invention permits funds to be deposited into a demand account from various sources, and also provides for the tendering of payments from the demand account via different instruments, without limitation as to the number of transfers, and with accrual of interest on the deposited funds.

51 Claims, 6 Drawing Sheets

U.S. PATENT DOCUMENTS

| | | | |
|---|---|---|---|
| 4,346,442 A | 8/1982 | Musmannot | |
| 4,376,978 A | 3/1983 | Musmannot | |
| 4,597,046 A | 6/1986 | Musmannot | |
| 4,674,044 A | 6/1987 | Kamusl | |
| 4,694,397 A | 9/1987 | Grantd | |
| 4,700,297 A | 10/1987 | Hagelr | |
| 4,751,640 A | 6/1988 | Lucas et al. | |
| 4,774,663 A | 9/1988 | Musmannot | |
| 4,953,085 A | 8/1990 | Atkins | |
| 4,985,833 A * | 1/1991 | Oncken | 705/42 |
| 5,126,936 A | 6/1992 | Champion et al. | |
| 5,206,803 A | 4/1993 | Vitagliano | |
| 5,235,507 A | 8/1993 | Sacklera | |
| 5,262,942 A | 11/1993 | Earled | |
| 5,270,922 A | 12/1993 | Higgins | |
| 5,291,398 A | 3/1994 | Hagan | |
| 5,297,032 A | 3/1994 | Trojand | |
| 5,424,938 A | 6/1995 | Wagner et al. | |
| 5,631,828 A | 5/1997 | Hagan | |
| 5,671,363 A | 9/1997 | Christofich | |
| 5,689,650 A | 11/1997 | McClelland | |
| 5,710,889 A | 1/1998 | Clark | |
| 5,765,144 A | 6/1998 | Larche | |
| 5,774,880 A | 6/1998 | Ginsberg | |
| 5,781,654 A | 7/1998 | Carney | |
| 5,806,048 A | 9/1998 | Kiron et al. | |
| 5,806,049 A | 9/1998 | Petruzzi | |
| 5,812,987 A | 9/1998 | Luskin | |
| 5,826,243 A | 10/1998 | Musmanno | |
| 5,852,811 A | 12/1998 | Atkins | |
| 5,864,685 A | 1/1999 | Hagan | |
| 5,878,258 A | 3/1999 | Pizia | |
| 5,878,405 A | 3/1999 | Grant et al. | |
| 5,890,141 A | 3/1999 | Carney | |
| 5,893,078 A | 4/1999 | Paulson | |
| 5,903,881 A | 5/1999 | Schrader et al. | |
| 5,905,974 A | 5/1999 | Fraser | |
| 5,940,809 A | 8/1999 | Musmanno | |
| 5,941,996 A | 8/1999 | Smith | |
| 5,946,667 A | 8/1999 | Tull et al. | |
| 5,950,175 A | 9/1999 | Austin | |
| 5,974,390 A | 10/1999 | Ross | |
| 5,978,779 A | 11/1999 | Stein | |
| 6,014,642 A | 1/2000 | El-Kadi et al. | |
| 6,016,482 A | 1/2000 | Molinari | |
| 6,026,438 A | 2/2000 | Piazza | |
| 6,041,314 A | 3/2000 | Davis | |
| 6,044,371 A | 3/2000 | Person | |
| 6,047,324 A | 4/2000 | Ford | |
| 6,052,673 A | 4/2000 | Leon et al. | |
| 6,088,685 A | 7/2000 | Kiron et al. | |
| 6,092,056 A | 7/2000 | Tull et al. | |
| 6,105,005 A | 8/2000 | Fuhrer | |
| 6,108,641 A | 8/2000 | Kenna | |
| 6,112,191 A | 8/2000 | Burke | |
| 6,131,810 A | 10/2000 | Weiss | |
| 6,154,770 A | 11/2000 | Kostakos | |
| 6,189,785 B1 | 2/2001 | Lowery | |
| 6,226,623 B1 | 5/2001 | Schein et al. | |
| 6,374,231 B1 | 4/2002 | Bent et al. | |
| 7,103,556 B2 | 9/2006 | Del Rey et al. | |
| 7,133,840 B1 | 11/2006 | Kenna | |
| 7,206,761 B2 | 4/2007 | Colvin | |
| 7,216,100 B2 | 5/2007 | Elliott | |
| 7,376,606 B2 | 5/2008 | Jacobsen | |
| 2001/0032182 A1 | 10/2001 | Kumar et al. | |
| 2002/0007330 A1 | 1/2002 | Kumar et al. | |
| 2002/0069147 A1 | 6/2002 | Sheehan et al. | |
| 2002/0091637 A1 | 7/2002 | Bent | |
| 2002/0128951 A1 | 9/2002 | Kiron et al. | |
| 2002/0161707 A1 | 10/2002 | Cole et al. | |
| 2002/0165757 A1 | 11/2002 | Lisser | |
| 2002/0178098 A1 | 11/2002 | Beard | |
| 2003/0023529 A1 | 1/2003 | Jacobsen | |
| 2003/0135437 A1 | 7/2003 | Jacobsen | |
| 2003/0149646 A1 | 8/2003 | Chen et al. | |
| 2003/0163403 A1 | 8/2003 | Chen et al. | |
| 2003/0177092 A1 | 9/2003 | Paglin | |
| 2003/0191702 A1 | 10/2003 | Hurley | |
| 2003/0236728 A1 | 12/2003 | Sunderji et al. | |
| 2004/0039674 A1 | 2/2004 | Coloma | |
| 2004/0107157 A1 | 6/2004 | Bleunven et al. | |
| 2004/0111361 A1 | 6/2004 | Griffiths et al. | |
| 2004/0128229 A1 | 7/2004 | Raines et al. | |
| 2004/0128235 A1 | 7/2004 | Kemper | |
| 2004/0162773 A1 | 8/2004 | Del Rey et al. | |
| 2005/0044038 A1 | 2/2005 | Whiting et al. | |
| 2005/0091137 A1 | 4/2005 | Woeber | |
| 2005/0102225 A1 | 5/2005 | Oppenheimer et al. | |
| 2005/0102226 A1 | 5/2005 | Oppenheimer et al. | |
| 2005/0108120 A1 | 5/2005 | Malka et al. | |
| 2005/0108149 A1 | 5/2005 | Bent et al. | |
| 2005/0114246 A1 | 5/2005 | Coloma | |
| 2005/0154662 A1 | 7/2005 | Langenwalter | |
| 2005/0228733 A1 | 10/2005 | Bent et al. | |
| 2006/0106703 A1 | 5/2006 | Del Rey et al. | |
| 2006/0155644 A1 | 7/2006 | Reid et al. | |
| 2006/0167773 A1 | 7/2006 | Yang et al. | |
| 2006/0273152 A1 | 12/2006 | Fields | |
| 2007/0043666 A1 | 2/2007 | Burdette | |
| 2007/0255655 A1 | 11/2007 | Kemper et al. | |
| 2007/0276752 A1 | 11/2007 | Whiting et al. | |
| 2007/0288400 A1 | 12/2007 | Menon | |
| 2008/0015985 A1 | 1/2008 | Abhari et al. | |
| 2008/0046358 A1 | 2/2008 | Holm-Blagg et al. | |
| 2008/0065532 A1 | 3/2008 | De La Motte | |
| 2008/0097899 A1 | 4/2008 | Jackson et al. | |
| 2008/0133280 A1 | 6/2008 | Ziegler | |

FOREIGN PATENT DOCUMENTS

| | | |
|---|---|---|
| WO | WO 95/23379 | 8/1995 |
| WO | WO-99/18529 | 4/1999 |
| WO | WO-03/012580 | 2/2003 |
| WO | WO-2005/006111 | 1/2005 |

OTHER PUBLICATIONS

ABA to Approve System for Sharing Deposit Coverage, American Banker (Feb. 11, 2003).

American Banker Online—New Pitch: Deposit Insurance Sharing, p. 1-4 (Jan. 21, 2003).

Blackwell, Rob, "New Pitch: Deposit Insurance Sharing", American Banker Online, Jan. 21, 2003.

Britt, Phil; "Struggling with Sweep Accounts,", American's Community Banker, Dec. 1997, v.6, n.12, p. 18-23.

Certificate of Deposit Registry Service: Keeping deposits in the corn patch; Banknews/Mar. 2003.

Heavyweight Fundiing, Bankers News, vol. II, Issue 5, p. 1-2 Mar. 4, 2003.

News article: "Regulators Support Demand Deposit Bill,", Regulatory Compliance Watch,Mar. 9, 1998; p. 1, vol. 9, No. 10.

Promontory Interfinancial Network; http://www.promnetwork.com/index.html (2003).

Bent, "Bruce Bent Makes Money Market Funds Act Like Bank Accounts," Equity BBDP, Oct. 5, 1998, 3 Sheets.

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Britt, "Struggling with Sweep Accounts," America's Community Banker, vol. 6, No. 12, 11 Sheets, Dec. 1, 1997.
Chapelle, "Merrill's Rivals Say They, Too. Offer Services Beyond Banking," Securities Data Publishing On Wall Street, 2 Sheets, Feb. 1, 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Hoffman, "Reserve's FDIC-Insured Account Draws Regionals; But some see little need for insurance," Crain Communications Inc., Investment News, 2 Sheets, Jun. 4, 2001.
Keenan, "Tapping Brokerages for Alternative to CDs," American Banker, The Financial Services Daily, 3 Sheets, Feb. 18, 2004.
Lavine, "Check Out High-Yield Checking Accounts," Broward Daily Business Review, vol. 39, No. 102, 2 Sheets, Apr. 27, 1998.
McReynolds, "The Power of Cash: Ho-hum cash can be great product (and lead to more business) in troubled times," Securities Data Publishing on Wall Street, 3 Sheets, Jun. 1, 2002.
McReynolds et al. "Unusual Products for Unusual Times," Securities Data Publishing on Wall Street, 6 Sheets, May 1, 2001.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking For Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
"Man Bites Dog: Funds Move Into Banking," IBC's Money Fund Selector, 2 Sheets, Nov. 6, 1998.
About iMoneyNet, Inc., About iMoneyNet's Money Funds Division, 4 Sheets, Aug. 21, 2003, http://www.ibcdata.com/about.htm.
"Reverse Ups Insurance Limit On Money Market Account," Thomson Financial Inc., Mutual Fund Market News, 1 Sheet, Aug. 26, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
The Reserve Fund, Study of U.S. Patent No. 6,374,231, 1 Sheet.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
Reserve Management Corporation, Reserve Insured Deposits, U.S. Appl. No. 76/315,600, Issued.
The Reserve, "What Sets Us Apart," 2 Sheets, Oct. 4, 2006, http://www.ther.com/bank/bank_wsua.shtml.
The Reserve, "Reserve Insured Deposits," 2 Sheets, Oct. 4, 2006, http://www.ther.com/ps/ps_fif.shtml.
The Reserve, "Company History," 3 Sheets, Oct. 4, 2006, http://www.ther.com/aboutus/history.shtml.

The Reserve, "Reserve Insured Deposits Program," 2 Sheets, Oct. 4, 2006, http://www.ther.com/bank/bank_insdep.shtml.
Reserve Insured Deposits, United States Patent and Trademark Office, Reg. No. 2,694,910, Registered Mar. 11, 2003, 1 Sheet.
The Reserve Funds Press Release "The Reserve Funds and Frontier Bank Partner to Offer Revolutionary Banking Product," 5 Sheets, Aug. 1, 2000.
Mutual Funds Magazine, Bargain Basement Funds, Oct. 1997, 2 Sheets.
Mutual Funds Magazine, Bargain Basement Funds, Oct. 1997, 1 Sheet.
Money Fund Report, IBC Financial Data, Inc., Nov. 6, 1998, 1 Sheet.
Liberman et al., Market Watch, "How Important are Banks?" FDIC Insurance on Deposits Just One Continuing Advantage, Oct. 17, 2006, 3 Sheets.
Declaration of Mr. Bruce Bent II, Vice Chairman and Registrant of Applicant. (3 Sheets) and Exhibits A, B, C and D (6 Sheets).
Capital Briefs: Corporate Checking Account Relief Sought, American Banker, vol. 162, Jul. 28, 1997, 1 Sheet.
U.S. Appl. No. 10/825,440, filed Apr. 14, 2004, Bent et al.
Announcing Changes in Automatic "Sweep" Investment Options, LPL Financial Services, Linsco/Private Ledger, Member NASD/SIPC, 26 Sheets.
Insured Cash Account Program Disclosure Booklet, LPL Financial Services, Linsco/Private Ledger, Member NASD/SIPC, 14 Sheets.
California Independent Bankers, ICBA Independent Community Bankers of America, Banker Bulletin, 2006, CIB 16th Annual Convention, vol. 4, Issue 6, http://www.cib.org/banker bulletin.htm, 2 Shhets.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
AB 2011 Assembly Bill—Bill Analysis, Senate Amendments, http://www.leginfo.ca.gov/pub/bill/asm/ab 2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No- Act., Lexis 1593, Securities Exchange Act of 1934—Section 15(a), 11 Sheets.
The Insured Savings Account, Issuer Guide to Offering MMDAs Through Merrill Lynch, Merrill Lynch Money Markets, Inc., "Operational Guide To The Merrill Lynch MMDA Program 1986", Sep. 1986 3 Sheets.
FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
Letter To Mr. Jonathan L. Levin, Esq., From Oliver Ireland, Associate General Counsel, Oct. 18, 1996, 2 Sheets.
Letter To Mr. L.P. Fleming, Jr., Esq., From Oliver Ireland, Associate General Counsel, Feb. 7, 1995, 3 sheets.

Letter To Mr. James E. Creekman, Group Vice President, From Oliver Ireland, Associate General Counsel, Aug. 1, 1995, 4 Sheets.

Letter To Ms. Brenda L. Skidmore, Senoir Vice President, From Oliver Ireland, Associate General Counsel, Aug. 30, 1995, 4 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

U.S. Appl. No. 60/307,815, filed Jul. 27, 2001.

U.S. Appl. No. 60/323,365, filed Sep. 20, 2001.

Letter From William W. Wiles, Secretary of the Board, Board of Governors of the Federal Reserve System, Jun. 22, 1983, 6 Sheets.

DI 48, Excerpts of Transcript of Hearing, U.S. Dist. Ct., District of Delaware, Civil Action No. 82-680, Apr. 8, 1983, 5 sheets.

DI 56, Interrog. Response, U.S. Dist. Ct. District of Delaware, Civil Action No. 82-680, May 20, 1983, 15 Sheets.

DI 99, Suppl. Interrogatory Response, U.S. Dist. Ct., District of Delaware, Civil Action No. 82-630, May 30, 1984, 6 Sheets.

Letter from Michael Bradfield, General Counsel, Board of Governors of the Federal Reserve System, Nov. 16, 1984, 4 Sheets.

Board of Governors of the Federal Reserve System, 1984 Fed. Res. Interp. Ltr. Lexis 56, Nov. 16, 1984, 3 Sheets.

Letter From Oliver I. Ireland, Associate General Counsel, Board of Governors of the Federal Reserve System, Jun. 22, 1988, 5 Sheets.

Board of Governors of the Federal Reserve System, 1988 Fed. Res. Interp. Ltr. Lexis 141, Jun. 22, 1988, 3 Sheets.

Board of Governors of the Federal Reserve System, 1989 Fed. Res. Interp. Ltr. Lexis 77, Mar. 14, 1989, 2 Sheets.

Board of Governors of the Federal Reserve System, 1989 Fed. Res. Interp. Ltr. Lexis 154, Jun. 21, 1989, 2 Sheets.

Board of Governors of the Federal Reserve System, 1990 Fed. Res. Interp. Ltr. Lexis 94, Feb. 1, 1990, 1 Sheet.

Board of Governors of the Federal Reserve System, 1991 Fed. Res. Interp. Ltr. Lexis 232, Jan. 30, 1991, 2 Sheets.

CMA, The Merrill Lynch Cash Management Account Financial Service, Insured Savings Account Participating Depository Institutions, Merrill Lynch, Pierce, Fenner & Smith Incorporated, Nov. 1992, 2 Sheets.

Board of Governors of the Federal Reserve System, 1994 Fed. Res. Interp. Ltr. Lexis 156, Jun. 24, 1994, 3 Sheets.

CMA, Insured Savings Account Fact Sheet, Merrill Lynch, Pierce, Fenner & Smith Incorporated, Jul. 1994, pp. 47-54.

Board of Governors of the Federal Reserve System, 1994 Fed. Res. Interp. Ltr. Lexis 314, Oct. 17, 1994, 2 Sheets.

Board of Governors of the Federal Reserve System, 1994 Fed. Res. Interp. Ltr. Lexis 419, Oct. 14, 1994, 4 Sheets.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

Letter from Stephanie Martin, Assoc. General Counsel, Board of Governors of the Federal Reserve System, Apr. 22, 2004, 8 Sheets.

Bank Deposit Program, Online http://web.archive.org/web/20030620100115/http:/www.smithbarney.com/products_serv, Jan. 19, 2001, 4 Sheets.

* cited by examiner

SYSTEMS AND METHODS FOR ADMINISTERING RETURN SWEEP ACCOUNTS

RELATED CASES

This is a Continuation-in-Part of patent application Ser. No. 09/176,340, filed on Oct. 21, 1998 now U.S. Pat. No. 6,374,231, and patent application Ser. No. 09/677,535, filed on Oct. 2, 2000, the disclosures of which are both incorporated by reference herein.

BACKGROUND OF THE INVENTION

1. Field of the Invention

The invention relates generally to computerized banking techniques and, more specifically, to techniques by which deposits are kept on a bank's balance sheet while being administered as sweep account funds by a third party.

2. Background Art

It would be desirable if investors could obtain fully-insured, interest-bearing bank accounts that offer an unlimited number of fund transfers per month. However, present statutory restrictions prevent banks and savings institutions from paying interest on certain types of deposit accounts. More specifically, Title 12, Part 329, of the Code of Federal Regulations (CFR) provides that "no bank shall, directly or indirectly, by any device whatsoever, pay interest on any demand deposit". (12 CFR 329.2). A "deposit" is any money placed into a checking account, savings account, Certificate of Deposit (CD), or the like. In a "demand" account, the owner can demand that funds be drawn and paid to another account (having the same or a different owner), or to a third party. These demand payments are typically implemented via bank drafts, checks, credit cards, and debit cards.

Not all bank accounts are considered to be demand accounts. If all, or a fixed amount, of the principal must be maintained in order to achieve the particular benefits afforded by that account, then the account is not a "demand" account. According to the CFR, a "demand deposit" includes any deposit for which the depositor is authorized to make more than six fund "transfers" during any month or statement cycle of at least four weeks. Not all fund transfers will be counted towards the allotted maximum of six; rather, it is necessary to examine the specific type of fund transfer under consideration. A deposit will be considered a "demand" deposit if the transfer takes place by means of a preauthorized, automatic, or telephonic order specifying the transfer of funds to another account of the depositor at the same bank, to the bank itself, or to a third party. Likewise, a deposit is a "demand" deposit if more than three of the six transfers are authorized to be made by check, draft or debit card (12 CFR 329.1(b)(3). On the other hand, an unlimited number of transfers is allowed between two accounts registered to the same person or entity, provided that the transfers are made by messenger, mail, telephone (but only via check mailed to the depositor), automated teller machine, or in person. Unless the funds of a deposit are held in a money market account (18 USC 1832 (a)), an account for which a depositor has the ability to make at least six transfers will be deemed a demand account, and no interest will be payable on the funds therein. Therefore, owners of demand accounts do not obtain interest on their funds.

One exemplary approach to offering investors fully-insured, interest-bearing accounts that provide up to an unlimited number of fund transfers was disclosed in U.S. patent application Ser. No. 09/176,340, referenced above. This application describes a system for managing a plurality of accounts for multiple clients. These accounts, which may originate from a variety of sources, banks, brokerage firms, and/or clients, are held at any of a plurality of savings institutions or banks. The system provides an aggregate insured money market deposit account at a bank or savings institution that is not necessarily an institution at which any of the client accounts are held. The aggregate insured deposit account is linked to each of the demand accounts in a manner so as to permit deposit funds to be placed into a demand account from various sources, and also so as to provide for the tendering of payments from the demand account via different instruments, without limitation as to the number of transfers. Interest is earned on deposits because funds are transferred from individual client accounts to the managed aggregate insured deposit account.

While a substantial advance over other prior art systems, the above noted system requires the transfer of oftentimes significant funds to comply with various banking regulations. This may be difficult in the case of smaller, community-based banks, as these institutions depend upon such funds as a source for loans. Moreover, some bank clients are not comfortable with arrangements that transfer client funds to unfamiliar third parties.

Pursuant to Regulation Q, banks are prohibited from paying interest on commercial accounts. However, banks have developed several approaches in an effort to compete with brokers who offer interest on cash balances for their commercial customers. These approaches, which include money fund sweeps and repo sweeps, are disadvantageous in that they involve a removal of commercial customer deposits from the bank's balance sheets.

A substantial market exists for an interest-bearing return sweep account that can be readily integrated into the existing infrastructure of a bank or savings institution, while, at the same time, permitting account funds to remain on the bank's balance sheet, with minimal disruption of existing bank-client relationships. It was with the foregoing realizations in mind that the present invention was developed.

OBJECTS AND SUMMARY OF THE INVENTION

It is an object of the invention to provide bank and/or savings institution clients with the ability to implement up to an unlimited number of transfers while, at the same time, permitting the bank and/or savings institution to retain client-deposited funds.

It is another object of the invention to provide bank and/or savings institution clients with interest from funds on deposit while simultaneously providing the ability to implement up to an unlimited number of transfers.

It is a further object of the invention to permit the bank and/or savings institution to retain client-deposited funds on its books so that these funds can be used as a source for loans.

It is yet a further object of the invention to provide a banking method that enables clients to deposit funds into an account from any of various sources, and to make payments from the account via any of various instruments, without limitation as to the number of transfers, while still earning interest on the funds in the account.

It is another object of the present invention to provide a banking method that manages a plurality of demand accounts for multiple clients whose funds are held in an aggregate insured deposit account at the client's banking institution but managed by a third party agent.

It is another object of the invention to provide a money market banking method that has a minimal impact on presently-existing, bank-to-client relationships.

It is a further object of the invention to provide a money market banking method which is readily integrable into the existing infrastructure of a bank or savings institution.

These and other objects of the invention are realized in the form of novel systems and methods for managing a plurality of client demand accounts so as to allow a banking institution to retain client deposits on the bank's balance sheets while at the same time, providing the client with the capability of implementing up to an unlimited number of transactions per month and also providing the client with interest on their account balance. These objectives are achieved through the use of an aggregate money market deposit account and an aggregate demand deposit account. These accounts are held on the books of the client's savings institution or bank, but are managed by a third party agent for the client. In response to client deposits and withdrawals, the agent initiates a transfer of funds between the aggregate demand deposit account and the aggregate money market deposit account. If client deposits exceed client withdrawals, then all or some of the funds in the aggregate demand deposit account may be transferred to the aggregate money market deposit account. On the other hand, if client withdrawals exceed client deposits, then all or some of the funds in the aggregate money market deposit account are transferred to the aggregate demand deposit account. The aggregate money market deposit account is an interest-bearing deposit account, where the aggregate balances for all clients are deposited.

One purpose of the aggregate demand deposit account is to facilitate the movement of funds. On a regular, periodic, or recurring basis, the agent calculates a net transaction as the sum of individual client deposits and withdrawals from the plurality of individual client demand accounts. The net transaction calculation is used to determine an amount of funds that need to be deposited into the aggregate money market deposit account to cover client deposits, or an amount of funds that needs to be withdrawn from the aggregate money market deposit account to cover client withdrawals. Individual account management calculations are performed to determine whether to deposit or withdraw funds from the aggregate demand deposit account to each of a plurality of individual client return sweep and/or money market accounts. The agent updates its database for each client's deposit and withdrawal activities.

The individual client has two accounts, a client demand deposit account on the bank's books, and a return sweep account or money market account on the agent's books. Individual transactions for the client occur between these two client accounts.

The agent distributes all or a portion of the interest accrued from the aggregate deposit account to individual clients. The interest is distributed according to the relative proportions of each client's funds in the aggregate deposit account. The agent maintains a database that keeps track of deposits to, and withdrawals from, each of the client demand accounts, as well as each client's proportionate and/or monetary share in the aggregate money market deposit account.

The invention permits funds to be deposited into a demand account from various sources, and also provides for the tendering of payments from the demand account via different instruments, without limitation as to the number of transfers, and with accrual of interest on the deposited funds. Moreover, the deposited funds are retained at the client's bank or savings institution. Optionally, the debiting of funds from each of the client accounts is monitored, and debits are selectively authorized or rejected based upon the client's account balance and/or their current share in the aggregate deposit account.

BRIEF DESCRIPTION OF THE DRAWINGS

The following is a brief description of the drawings, in which.

DETAILED DESCRIPTION OF THE PREFERRED EMBODIMENTS

Figure 1:
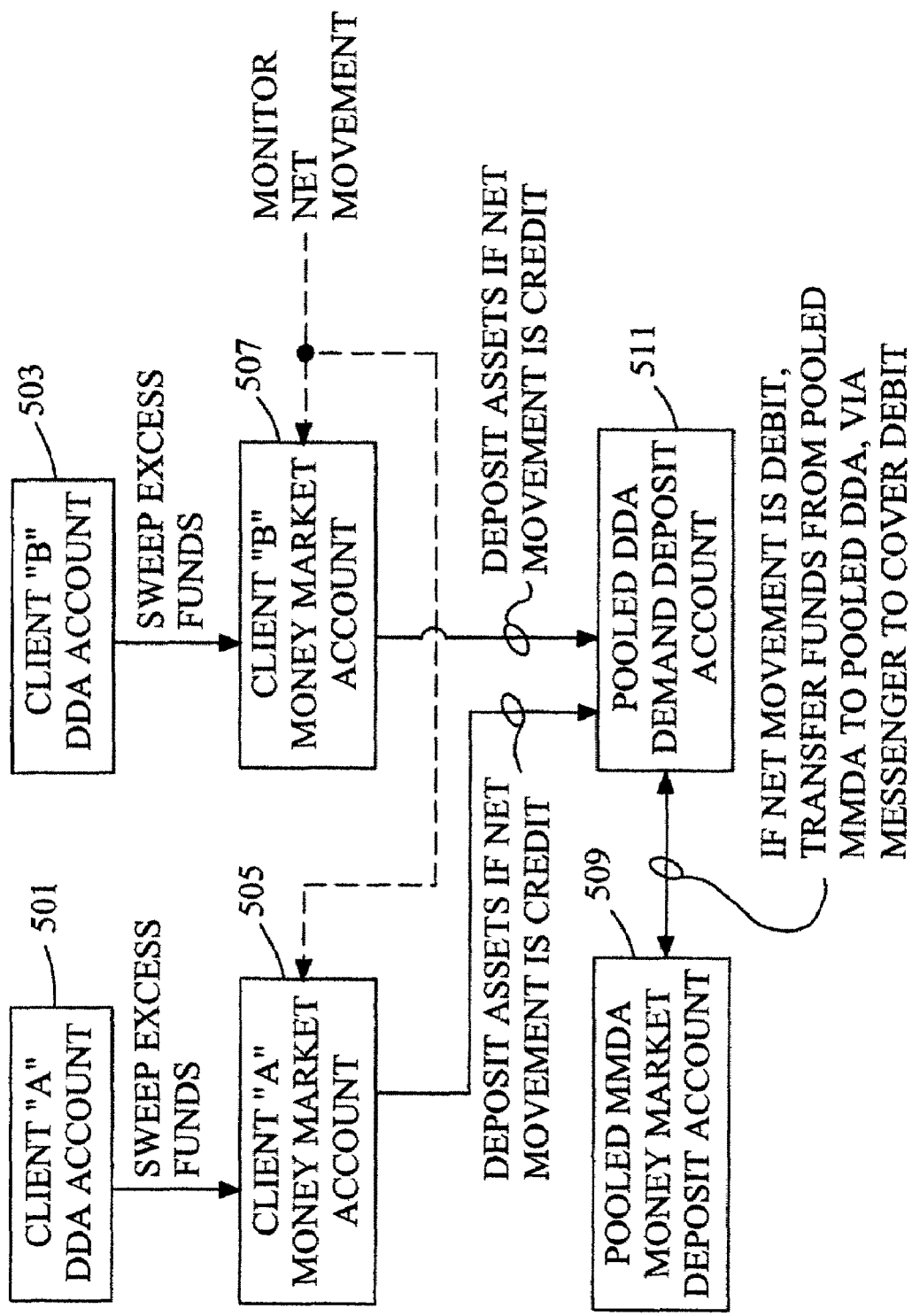
FIG. 1 is an information flow diagram showing the transfer of client finds among a plurality of accounts pursuant to the techniques of the present invention.

Refer now to FIG. 1, which is a flow diagram showing the transfer of client funds among a plurality of accounts pursuant to the techniques of the present invention. A plurality of client demand accounts, including Client "A" DDA (Demand Deposit Account) 501 and Client "B" DDA Account 503 are managed through the use of an insured pooled deposit account at the client's savings institution or bank. In FIG. 1, this pooled deposit account is provided in the form of a Pooled MMDA (Money Market Deposit Account) 509. Excess funds are swept from client DDA accounts (Client "A" DDA 501 and Client "B" DDA 503, respectively) to corresponding client Money Market Accounts (Client "A" Money Market Account 505 and Client "B" Money Market Account 507, respectively). Excess funds may be calculated in terms of a desired or target minimum balance for each of the client DDA accounts. The same target minimum balance could be applied to all DDA accounts, or an account-specific target balance could be assigned to a certain account based upon the past history and/or the expected usage of that account. Alternatively, all finds could be swept from the client DDA accounts to the Money Market Accounts. After recording the amount of funds swept into a client Money Market Account, the funds are then transferred to the Pooled MMDA Account 509.

The net result of the aforementioned fund transfer activity is that funds are effectively transferred from individual client demand accounts, including Client "A" DDA 501 and Client "B" DDA 503, to a pooled insured deposit account (Pooled MMDA Account 509) at the client's bank or savings institution. This is advantageous in that the Pooled MMDA account 509 is an interest-bearing "non-demand" account pursuant to 12 CFR 329.2 et seq. Moreover, the Pooled MMDA Account is eligible for full FDIC insurance protection. This protection covers each client whose deposits are placed into the pooled account, up to a maximum of $100,000 per client. As the Pooled MMDA Account 509 accrues interest, all or a portion of this interest is distributed to individual clients. The interest may, but need not, be distributed according to the relative proportions of each client's funds in the Pooled MMDA Account 509.

A database keeps track of deposits to, and withdrawals from, each of the client demand accounts (Client "A" DDA Account 501 and Client "B" DDA Account 503), as well as each client's proportionate and/or monetary share in the Pooled MMDA Account 509. On a regular, periodic, or recurring basis, a net transaction is calculated as the sum of individual client deposits and withdrawals from the plurality of demand accounts. The net transaction calculation is used to determine an amount of funds, if any, that needs to be deposited into the Pooled MMDA Account 509 from the individual client Money Market Accounts (Client "A" Money Market Account 505 and/or Client "B" Money Market Account 507) to cover client deposits. The net transaction calculation is also used to determine an amount, if any, of funds that need to be withdrawn from the Pooled MMDA Account 509 to cover client withdrawals from respective client DDA Accounts (Client "A" DDA Account 501 and/or Client "B" DDA Account 503). In the event that fund withdrawals are required, the necessary funds are first transferred from the Pooled MMDA Account 509 to a Pooled DDA (Demand Deposit Account) 511 which is held at the same savings institution or bank as Pooled MMDA Account 509. On an as-needed basis, funds are then transferred from the Pooled MMDA Account 509 to individual client DDA accounts (Client "A" DDA Account 501 or Client "B" DDA Account 503) to cover checks written by these clients, as well as any fund withdrawals or transfers that clients wish to implement on behalf of their respective DDA Accounts.

Individual account management calculations are performed to determine whether to deposit or withdraw funds from the Pooled DDA Account 511 to each of a plurality of individual client demand accounts. The database is updated for each client's deposit and withdrawal activities. The invention permits funds to be deposited into a client demand account from various sources, and also provides for the tendering of payments from the client demand account via different instruments, without limitation as to the number of transfers, and with accrual of interest on the deposited funds. Optionally, the debiting of funds from each of the client demand accounts is monitored, and debits are selectively authorized or rejected based upon the client's demand account balance and/or their current share in the pooled deposit account.

The foregoing procedures are structured in a manner so as to permit banks and savings institutions to continue servicing their clients as they have done in the past. Moreover, if desired, these procedures could be implemented by an agent acting on behalf of one or more clients. In this manner, the invention would be virtually transparent to presently-existing banks and savings institutions. Bank personnel would not be burdened with the requirement to perform unfamiliar and potentially time-consuming procedures. Pursuant to this "agency" approach, the agent effectively provides a "sweep interface" between a client's existing DDA account (i.e., Client "A" DDA Account 501) and a fully-insured, interest-bearing pooled account (i.e., the Pooled MMDA Account 509). The agent opens up the Pooled MMDA Account 509 and the Pooled DDA Account 511 at the client's bank or savings institution. The agent is responsible for several administrative activities, including: (1) recordkeeping in connection with the individual Client Money Market accounts (Client "A" Money Market Account 505 and Client "B" Money Market Account 507); (2) determining each client's proportionate share in the Pooled MMDA Account 509; (3) determining an appropriate balance for the Pooled DDA Account 511; and (4) determining appropriate transfers from the Pooled DDA Account 511 to any of the client DDA accounts.

Although banks and savings institutions can provide DDA, MMDA and checking account services to clients without utilizing a third-party agent, under the current statutory scheme, these institutions cannot pay interest on account balances, and at the same time, allow for an unlimited number of transactions. Pursuant to Regulation D, banks and savings institutions are prohibited from automatically allowing unlimited fund transfers between DDAs and MMDAs on behalf of clients. A client could open up his own DDA and MMDA accounts, evaluate daily DDA activities, determine if funds should be moved between the DDA and the MMDA, and instruct the bank to transfer the appropriate funds. However, it would be time consuming and inefficient. The use of an agent provides administrative expediency, rendering the entire operational scheme more attractive to the client as well as the banking institution.

Advantageously, the agent maintains the client's original DDA account number that uniquely identifies that client's account at his or her bank or savings institution. This account number is used as a cross-reference to keep track of each client's proportionate interest in the Pooled MMDA Account 509. The client Money Market Account numbers (for Client "A" Money Market Account 505 and Client "B" Money Market Account 506) are transparent to these clients, as is the account number for the Pooled MMDA Account 509.

Effectively, a "sweep interface" exists between each of respective individual client DDA Accounts (Client "A" DDA Account 501 and Client "B" DDA Account 503) and corresponding individual client Money Market Accounts (Client "A" Money Market Account 505 and Client "B" Money Market Account 507). Excess funds in the individual client DDA accounts are swept to the individual client Money Market accounts to be further credited to the Pooled MMDA Account 509. If funds are needed to pay for a check or handle a withdrawal, funds are redeemed via the Pooled DDA Account 511. The sweep interface may be governed by any of a number of established or specified parameters. For example, the bank may choose to leave a certain dollar amount in each of the client DDA accounts to cover checks and only sweep funds in excess of that amount. Or the bank may decide to sweep everything and redeem funds based upon the checks presented for payment. From the standpoint of the bank or savings institution, no additional work is required. The bank merely maintains the client's existing individual DDA account along with the client's profile (name, address, check reorders, signature on file, stop payment orders, etc). Bank clients will be able to keep their existing checks, and to continue using their existing DDA accounts. Deposits are credited to these DDA accounts and then swept to the pooled MMDA account. Many of the required administrative activities are performed by the agent on behalf of designated client accounts. These administrative activities basically involve the monitoring of fund sweeping to and from individual client DDA accounts and corresponding individual Money Market accounts, as well as transfers among the individual Money Market, Pooled MMDA and Pooled DDA Accounts maintained by the agent. On a daily, regular, repeated, or periodic basis, the bank or savings institution transmits a transaction sweep data file to the agent that includes deposit and withdrawal information for each of a plurality of clients. The bank and the agent periodically or repeatedly reconcile the sweep data file and agree upon a net settlement figure. If the net settlement figure is a credit, the bank or savings institution credits the Pooled DDA Account 511. During routine, day-to-day system operations, the only transactions that occur in the Pooled MMDA Account 509 are transfers either to or from the Pooled DDA Account. Pursuant to an optional alternative approach, the bank could allocate credits to the Pooled MMDA Account 509. In any event, if the net settlement figure is a debit, the bank or savings institution debits the Pooled DDA Account 511. The agent provides instructions by messenger to transfer funds from the Pooled MMDA Account 509 to the Pooled DDA Account 511 to cover the debit balance in the account. At the end of a predetermined period of time (such as a month), the agent can provide a monthly statement file to the bank or savings institution. This file may include activity for a client's individual money market account as maintained in an agent database. The bank or savings institution can then use this monthly statement file to generate month end statements for its clients. According to one preferred embodiment of the invention, activity pertaining to other accounts is tracked and maintained by the bank or savings institution. However, pursuant to an alternate embodiment, this statement file could optionally include Pooled MMDA, Pooled DDA, individual Money Market, and/or individual DDA account activity.

Figure 2:
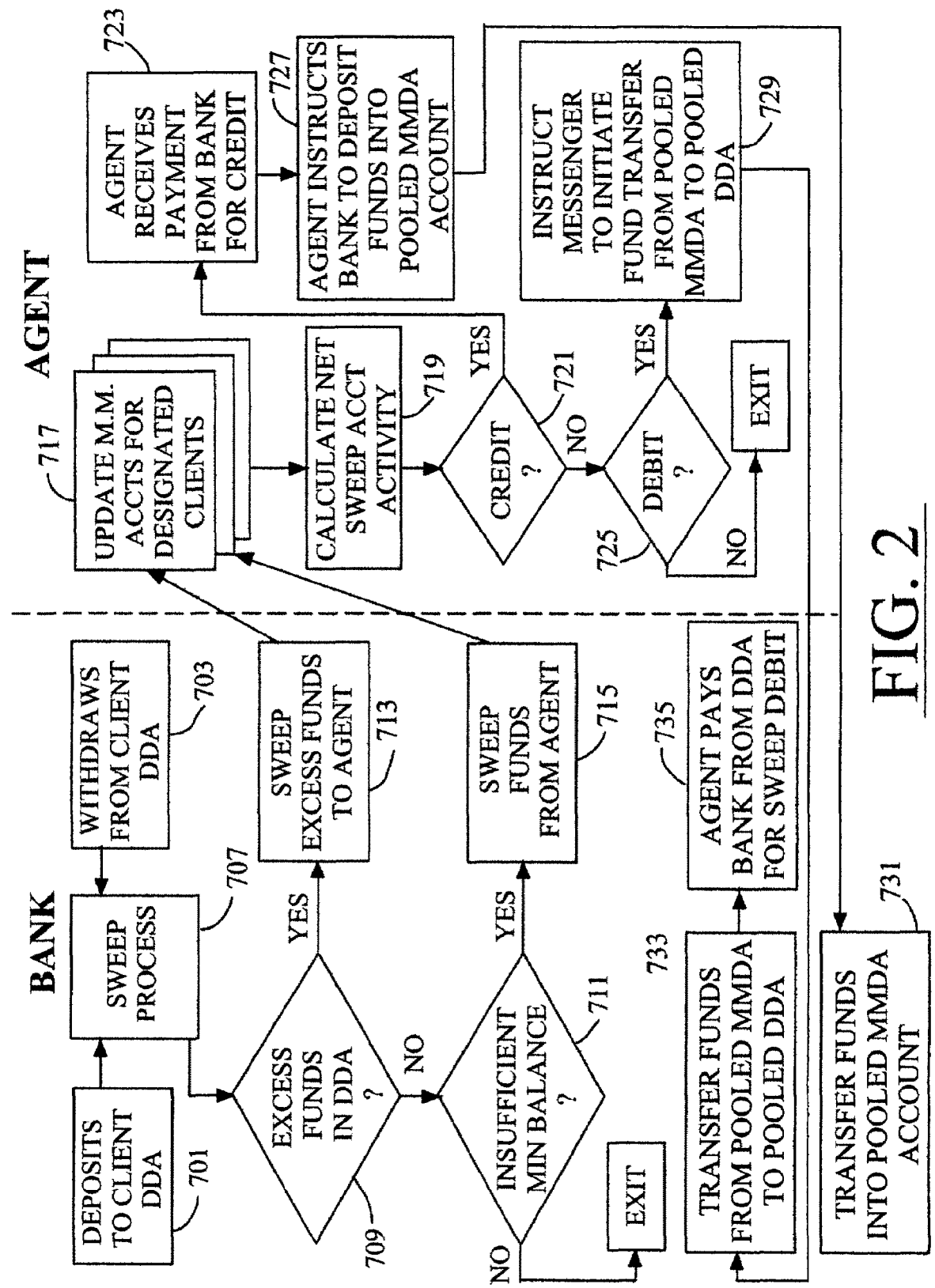
FIG. 2 is a flowchart showing an illustrative operational sequence for implementing the techniques of the present invention.

Refer now to FIG. 2, which is a flowchart showing an illustrative operational sequence for implementing the techniques of the present invention. The procedure commences at block 701, where a client makes a deposit to their individual DDA Account (i.e., Client "A" DDA 501, FIG. 1), or at block 703, where a client makes a withdrawal from their individual DDA Account. Irrespective of whether the transaction is a withdrawal or a deposit, a sweep process is performed (block 707) to sweep any excess account finds out of the client's individual DDA account, or to sweep required funds into this DDA account. A test is performed at block 709 to ascertain whether or not there are excess funds in the individual client's DDA account. If so, program control jumps ahead to block 713, whereas if not, the program continues on to block 711. At block 713, the excess funds are swept to the agent, who then updates the individual client Money Market account (block 717).

The negative branch from block 709 leads to block 711, where a test is performed to ascertain whether or not there is an insufficient minimum balance in the individual client's DDA account. If not, the program exits. If so, program control advances to block 715 where funds are swept from the agent. The agent then updates the individual client Money Market account (block 717). Next, on a periodic, repeated, or scheduled basis, the agent calculates the net sweep account activity (block 719). A test is performed at block 721 to ascertain whether or not the net sweep activity is a credit. If so, program control advances to block 723 and, if not, program control continues to block 725. At block 723, the agent receives payment from the bank for the credit. Payment can be received, for example, in the form of a wire transfer or a credit to the pooled DDA account. Next, the agent instructs the bank to deposit the received funds into the pooled MMDA account (block 727). Funds are transferred into the pooled MMDA account (block 731), and the program exits.

The negative branch from block 721 leads to block 725 where a test is performed to ascertain whether or not the net sweep activity is a debit. If not, the program exits and, if so, the program continues to block 729. At block 729, a messenger is instructed to initiate a fund transfer from the pooled MMDA account to the pooled DDA account. The funds are transferred from the pooled MMDA to the pooled DDA (block 733), and the agent pays the bank or savings institution from the pooled DDA account for the sweep debit. The program then exits.

Figure 3:
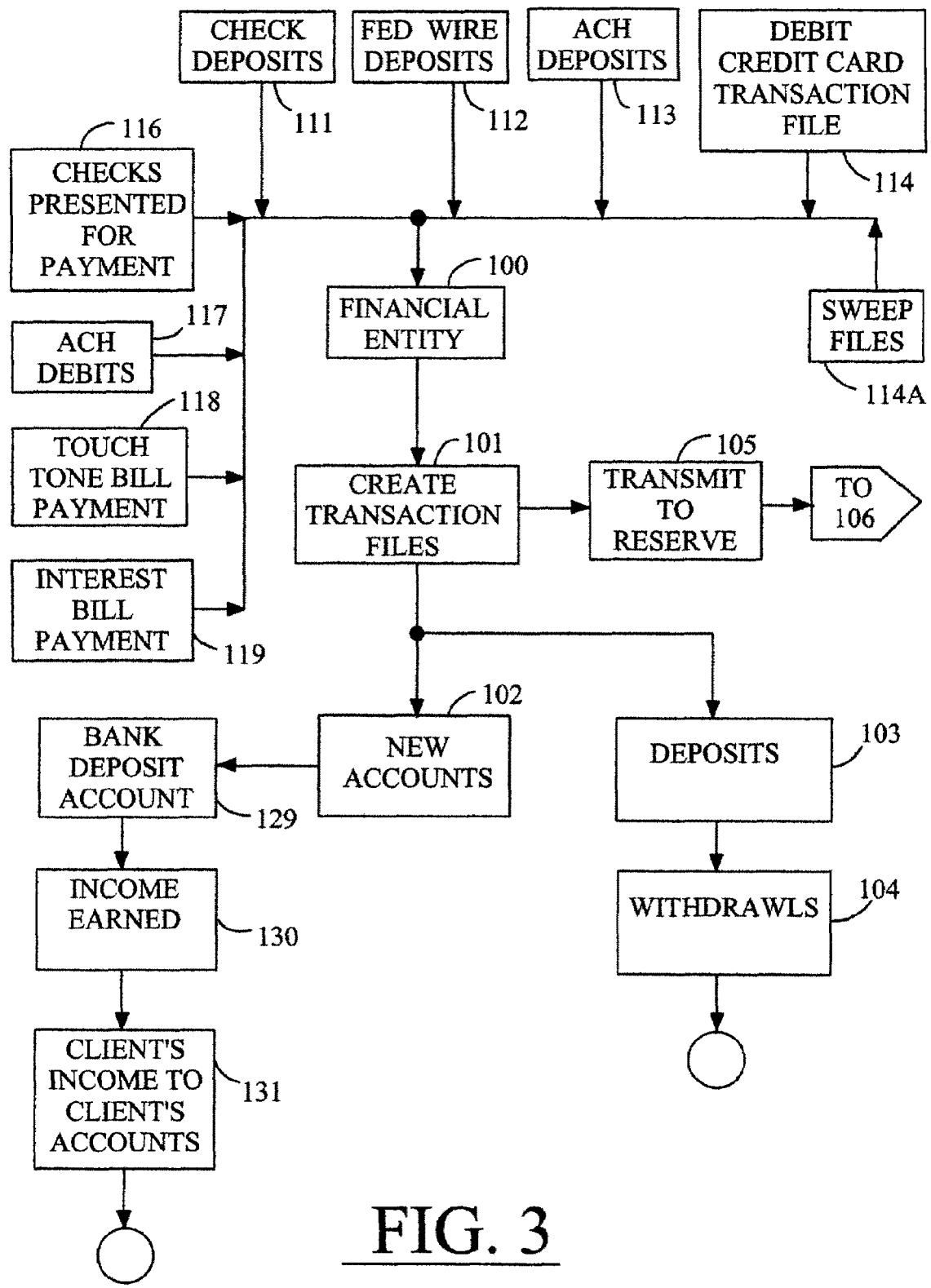
FIGS. 3-6 together comprise a flowchart depicting processing steps to be performed on behalf of an administrator pursuant to a further embodiment of the present invention.
Figure 4:
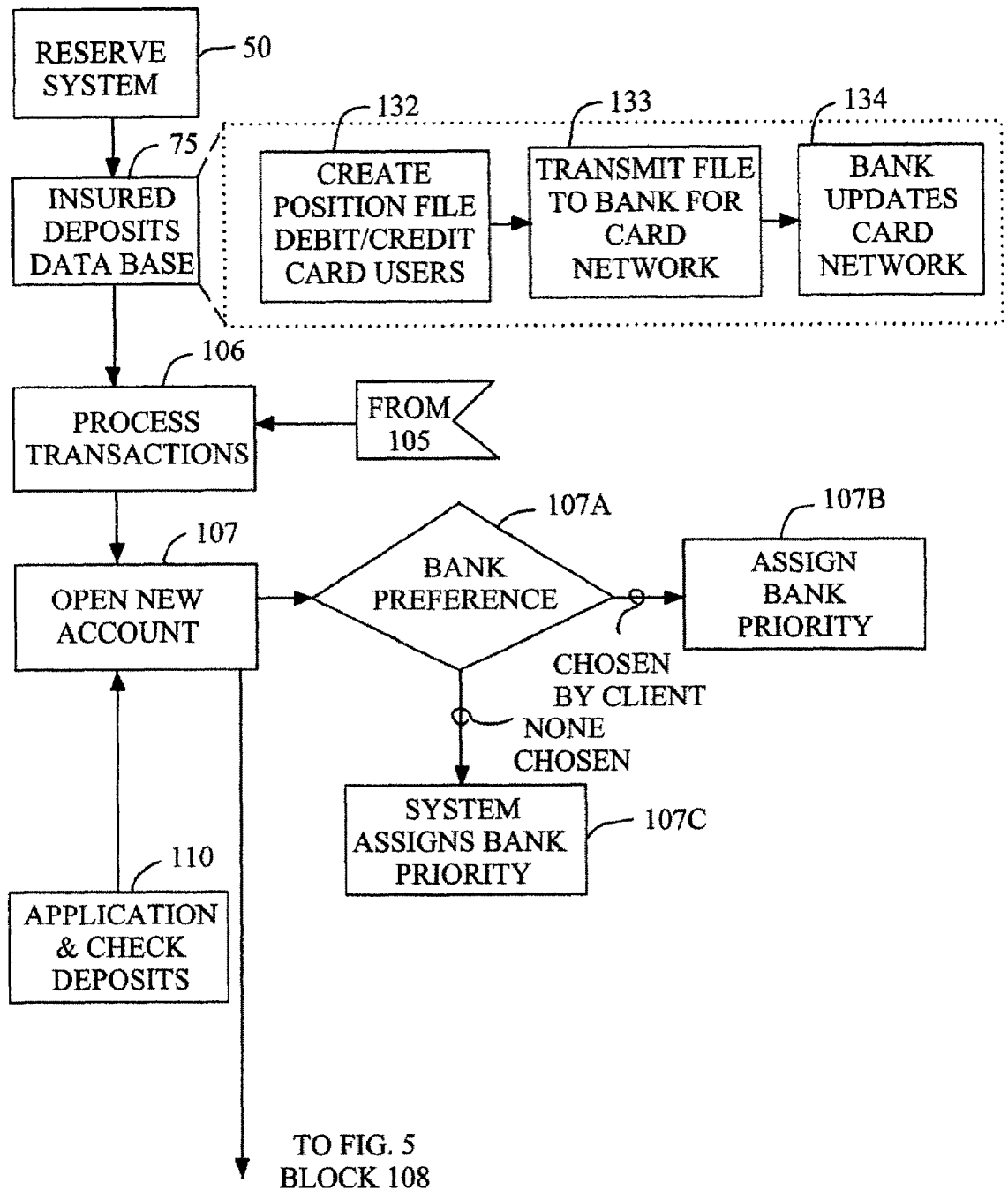

FIGS. 3 and 4 together comprise a flowchart depicting processing steps to be performed on behalf of an agent or administrator pursuant to a further embodiment of the present invention. This agent or administrator can be a brokerage firm, a bank, or another financial entity with which clients can institute financial transactions such as deposits, withdrawals and on-demand payments. The administrator or agent appears to each client as if it were, at least in part, a bank, by accepting deposits for the client's account, and, subsequently, by authorizing (and then implementing) payments demanded by the client from his or her account. The funds for all of the clients are pooled into a single deposit account that is maintained as an insured deposit account at a licensed bank or savings institution.

Referring to FIG. 3, financial entity 100 may be a bank, savings institution, brokerage firm, or other entity where financial transactions take place or can be facilitated. This financial entity 100 creates transaction files 101 which are transmitted to Reserve 105. Reserve 105 (or the Reserve System) is the administrator or other entity in charge of administering at least one of the deposit accounts. New account files 102 can be transmitted to Reserve 105. For example, a new investor account may need to be opened. This activity necessitates organizing and coordinating information to service a new investor for the present system, even though that investor may already be a client of a financial entity 100 for other investment vehicles. A new account 102 effectively becomes part of an existing pooled bank deposit account 129 that collects earned income 130, all or a portion of which is eventually conveyed to the client's accounts 131. Of course, at some point in time, the deposit account must first be established with clients' funds. The transaction files represent the addition of funds by check (to be drawn on another institution, or to be drawn from a different demand account at the same institution), wire or electronic transfer, ACH, credits (such as from a debit or credit card merchant), or a sweep from one of the client's other accounts. Accordingly, encompassed in the transaction file are deposits 103 and withdrawals 104. A "sweep" includes the automatic transfer of funds, such as the automated transfer of interest from one account into the client's account, as well as the automated transfer of funds out of the client's account (such as for payment of a securities trade); thus, a sweep may be from one of the client's accounts to another. The responsibility for maintaining the deposit account can be assigned by the administrator to a third party.

Figure 5:
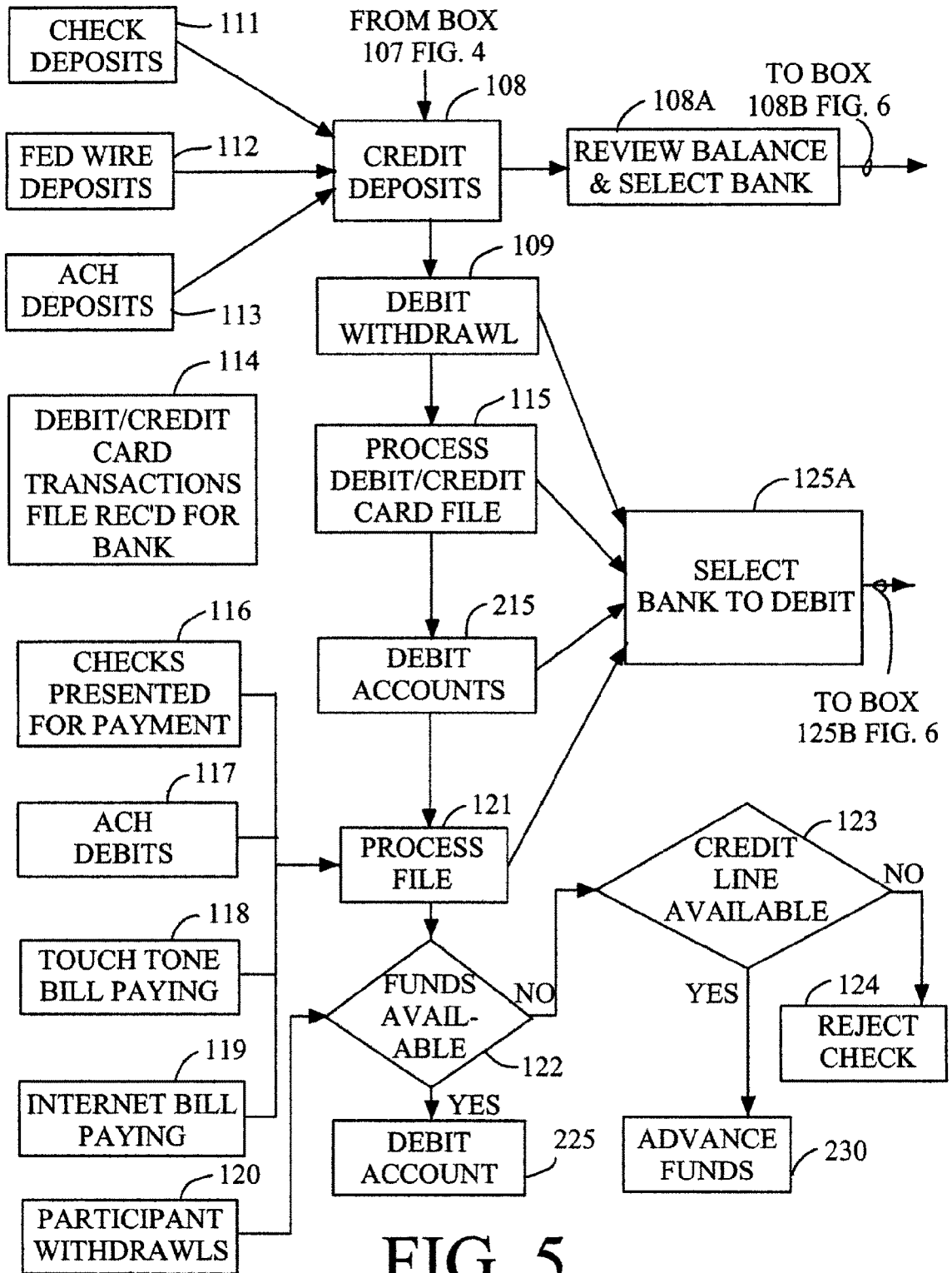
Figure 6:
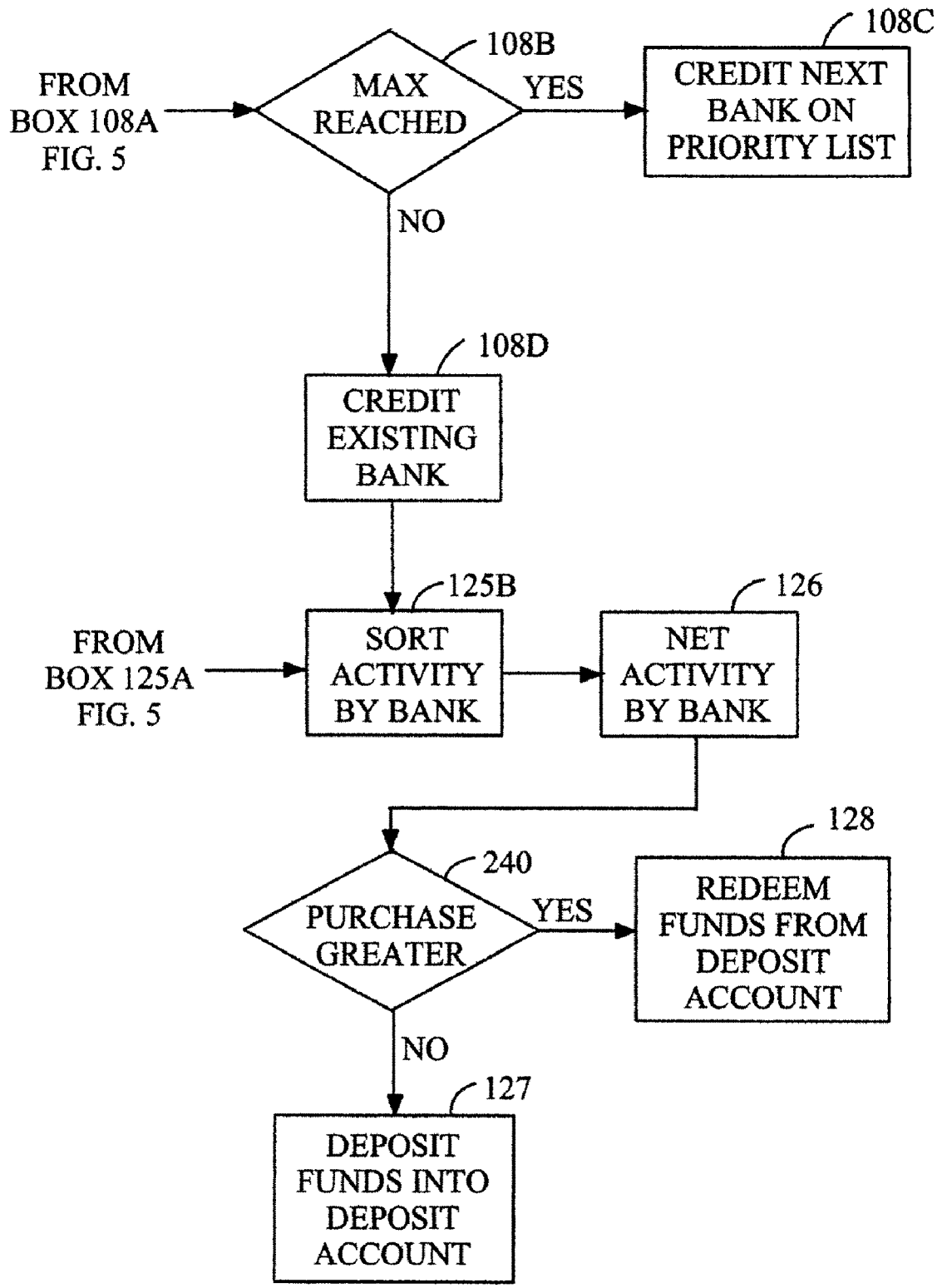

Referring now to FIG. 4, Reserve System 50 contains an insured deposit database 75 where a position file for debit/credit card users is created 132 and transmitted to a bank for a debit/credit card network 133 where the bank then updates the network 134. The system updates the data base 75 and processes transactions 106 (from 105, FIG. 3) and opens a new account 107 where application and check deposits are processed 110. The bank preference 107A is the list of banks and the order of preference for deposits and withdrawals held on the account, including a list of banks to be excluded (if any), and the maximum percentage and/or amount of funds to be held in each bank. The client's bank preference data is added to the account at 107B. If the client does not select values for any of these variables, the system can provide default values for the banks and their order at 107C sufficient for all of the client's funds. When possible, the system can be configured to assign a bank that is in the state in which the client resides. Referring to FIG. 5, it can be seen that when a deposit, either a check deposit 111, federal wire deposit 112, ACH deposit, sweep, or other deposit is credited to the client's account 108, the system will review where the existing funds of the accounts are deposited 108A. If the client's balance has reached the maximum allowable balance for the existing bank 108B, as shown in FIG. 6, the system will then select the next bank on the preference list attached to the account 108C. If the maximum allowable balance has not been reached in the existing bank, the system will credit the additional funds to that bank 108D.

Still referring to FIG. 5, the procedure for processing withdrawals can be seen. Various methods of withdrawing funds are debit withdrawal 109, processing debit or credit card transactions such as debit/credit card files 115, direct debit accounts 215, and processing of files 121. Processing of a debit/credit card file 115 utilizes data accumulated from debit/credit card transactions received from the banks 114. The processing of file 121 procedure utilizes one of various sources of data such as a check presented for payment 116, ACH debits 117, touch tone bill paying 118, and/or internet bill paying 119.

After processing the debit procedure, the system will review the bank preference list and select the appropriate bank to debit 125A. The system will sort all the daily transactions by the bank 125B (see FIG. 6). The activity for each bank will then be netted 126 and the appropriate deposit or withdrawals made.

The system will then determine whether funds are available 122, which function is also associated with other participant withdrawals 120. If the funds are available, the account is debited 225. If the funds are not available, however, the system determines whether a credit line is available 123. If a credit line is available, then funds are advanced 230 to cover the debit; if not the transaction is rejected 124.

Referring to FIG. 6, as previously stated, the system determines whether the client's balance reaches its maximum 108B. If so, the next bank on the list selected by the client is credited 108C. If the maximum is not reached, then the existing bank is credited 108D. Information and activities associated with processed debits and credits of the client's accounts from 125A are sorted by the bank 125B and the net activity by the bank is determined 126. The system then determines whether the deposits and credits were greater than the withdrawals and debits 240. If so, the excess funds are deposited into a deposit account 127. If the debits and withdrawals were greater than the credits, the difference is redeemed from the deposit account 128.

Thus, by practicing the embodiment of the invention described in connection with FIGS. 3-6, an individual client is effectively provided with FDIC insurance in excess of $ 100,000. This result is brought about because the individual client's holdings are maintained in multiple insured deposit accounts, which may be in multiple banks.

The foregoing description is intended to be illustrative and not limiting. Any of various changes, modifications, and/or additions may become apparent to the skilled artisan upon a perusal of this specification, and, as such, are intended to be within the scope and spirit of the invention as defined by the claims.

What is claimed is:

1. A computer-implemented method for managing funds for a plurality of client accounts for a plurality of clients whose funds were accepted for deposit in respective client accounts held in the names of the respective clients at a first banking institution, the method comprising:
    (a) maintaining a plurality of FDIC-insured and interest-bearing aggregated deposit accounts, each aggregated deposit account held in a different respective bank of a different respective banking institution including an FDIC-insured and interest-bearing aggregated deposit account held at the first banking institution;
    (b) maintaining or having maintained an electronic database, on one or more computer-readable media, containing information on funds held by each client in the plurality of aggregated deposit accounts;
    (c) administering the aggregated deposit accounts to transfer or have transferred client funds that had been accepted into respective client accounts held in the names of the respective clients at the first banking institution to the aggregated deposit account at the first banking institution except that for clients with a balance of funds in the aggregated deposit account at the first banking institution that equal or exceed a specified amount depositing or having deposited additional funds of that client to one of the aggregated deposit accounts in a different one of the banking institutions;
    (d) withdrawing or having withdrawn client funds from the FDIC-insured and interest-bearing aggregated deposit account held at one of the banks of one of the banking institutions more than six (6) times during a month while preserving an insured and interest-bearing status of the FDIC-insured and interest-bearing aggregated deposit account held at the one bank; and
    (e) updating or having updated the electronic database based on the transfers to and withdrawals in the plurality of aggregated deposit accounts.

2. The method of claim 1, wherein the withdrawing or having withdrawn step is made from an aggregated deposit account at one of the banking institutions through an aggregated demand deposit account at that banking institution.

3. The method of claim 2, further comprising selecting the different one of the banking institutions to deposit the additional funds to the aggregated deposit account held thereby based at least on one or more exclusions of banking institutions made by the client.

4. The method of claim 1, further including the step of, on a regular, periodic, or recurring basis, calculating a net transaction as the sum of individual client deposits and withdrawals from each of the plurality of the client accounts; and, further including the step of utilizing the net transaction calculation to determine an amount of funds that need to be deposited into one or more of the aggregated deposit accounts to cover client deposits, or an amount of funds that needs to be withdrawn from one or more of the aggregated deposit accounts to cover client withdrawals.

5. The method of claim 1, further including the steps of: (a) monitoring requested debits of funds from each of the client accounts, and (b) selectively authorizing or rejecting each of the requested debits based upon an account balance in a client account or a client's proportionate share in the plurality of aggregated deposit accounts or based upon both the account balance in the client account and the client's proportionate share in the plurality of aggregated deposit accounts.

6. The method of claim 1, wherein the withdrawing or having withdrawn step is substantially performed only by one or more of the following methods: in person, or by mail, or by messenger, or by telephone and distributed by mail, or by automated teller machine, or a combination thereof so that the insured and interest-bearing status of the aggregated deposit accounts is preserved.

7. The method of claim 1, further comprising selecting the different one of the banking institutions to deposit the additional funds to the aggregated deposit account held thereby based at least on one or more exclusions of banking institutions made by the client.

8. The method of claim 1, further comprising selecting the different one of the banking institutions to deposit the excess over the specified amount to the aggregated deposit account held thereby based on an exclusion of banking institutions located in a state where the client resides.

9. The method of claim 1, withdrawing or having withdrawn client funds from the FDIC-insured and interest-bearing aggregated deposit account held at a second one of the banks of a second one of the banking institutions more than six (6) times during a month while preserving an insured and interest-bearing status of the FDIC-insured and interest-bearing aggregated deposit account held at the second one of the banks.

10. The method of claim 1, withdrawing or having withdrawn client funds from the FDIC-insured and interest-bearing aggregated deposit account held at a second one of the banks of a second one of the banking institutions more than six (6) times during a month while preserving an insured and interest-bearing status of the FDIC-insured and interest-bearing aggregated deposit account held at the second one of the banks.

11. A computer-implemented method for managing funds for a plurality of client accounts for a plurality of clients whose funds were accepted for deposit in respective client accounts held in the names of the respective different clients at a first banking institution, the method comprising:
  (a) accepting client funds from each of a plurality of the clients, with funds from each different client being accepted into a respective client account held in the name of that respective client at the first banking institution;
  (b) maintaining or having maintained an FDIC-insured and interest-bearing aggregated deposit account at the first banking institution;
  (c) maintaining or having maintained or receiving access by computer to an electronic database, on one or more computer-readable media containing information on funds held by each client in a plurality of FDIC-insured and interest-bearing aggregated deposit accounts, each aggregated deposit account held at a different banking institution;
  (d) transferring or have transferred client funds of a plurality of the client accounts to the aggregated deposit account at the first banking institution except that for clients with a balance of funds in the aggregated deposit account at the first banking institution that equal or exceed a specified amount depositing or having deposited additional funds of that client to one of the aggregated deposit accounts in a different one of the banking institutions;
  (e) withdrawing or having withdrawn client funds from the aggregated deposit account held in one of the banks of one of the banking institutions more than six (6) times during a month while preserving an insured and interest-bearing status of that aggregated deposit account in the one bank; and
  (f) updating the electronic database based on the transfers to and withdrawals in the plurality of aggregated deposit accounts or receiving electronic access.

12. The method of claim 11, wherein the withdrawing or having withdrawn step is made from an aggregated deposit account at the first banking institutions through an aggregated demand deposit account at the first banking institution.

13. The method of claim 12, further comprising receiving a selection from one or more clients of exclusions of one or more banking institutions, and providing such exclusions to assist in selecting the different one of the banking institutions to deposit the additional funds to the aggregated deposit account held thereby.

14. The method of claim 11, further comprising receiving a selection from one or more clients of exclusions of one or more banking institutions, and providing such exclusions to assist in selecting the different one of the banking institutions to deposit the additional funds to the aggregated deposit account held thereby.

15. The method of claim 11, further comprising receiving from one or more clients an exclusion of banking institutions located in a state where the client resides, and providing such exclusion to assist in selecting the different one of the banking institutions to deposit the additional funds to the aggregated deposit account held thereby.

16. The method of claim 11, further including the step of, on a regular, periodic, or recurring basis, calculating a net transaction as the sum of individual client deposits and withdrawals from each of the plurality of the client accounts; and, further including the step of utilizing the net transaction calculation to determine an amount of funds that need to be deposited into one or more of the aggregated deposit accounts to cover client deposits, or an amount of funds that needs to be withdrawn from one or more of the aggregated deposit accounts to cover client withdrawals.

17. The method of claim 11, wherein the withdrawing or having withdrawn step is substantially performed only by one or more of the following methods: in person, or by mail, or by messenger, or by telephone and distributed by mail, or by automated teller machine, or a combination thereof so that the insured and interest-bearing status of the aggregated deposit account at the first banking institution is preserved.

18. A computer-implemented method for managing funds for a plurality of client accounts for a plurality of clients whose funds were accepted for deposit in respective client accounts held in the names of the respective clients at a first banking institution that includes a first bank in its infrastructure, the method comprising:
  (a) maintaining a plurality of FDIC-insured and interest-bearing aggregated deposit accounts, each aggregated deposit account held in a different respective bank of a different respective banking institution including an FDIC-insured and interest-bearing aggregated deposit account held at the first bank in the first banking institution;
  (b) maintaining or having maintained an electronic database, on one or more computer-readable media, containing information on funds held by each client in the plurality of aggregated deposit accounts;
  (c) administering the aggregated deposit accounts to transfer or have transferred client funds that had been accepted into respective client accounts held in the names of the respective clients at the first banking institution to the aggregated deposit account at the first bank except that for clients with a balance of funds in the aggregated deposit account at the first bank that equal or exceed a specified amount depositing or having deposited additional funds of that client to one of the aggregated deposit accounts in one of the different banks in one of the different banking institutions;
  (d) withdrawing or having withdrawn client funds from the FDIC-insured and interest-bearing aggregated deposit account held at one of the banks of one of the banking institutions more than six (6) times during a month while preserving an insured and interest-bearing status of the FDIC-insured and interest-bearing aggregated deposit account held at the one bank; and
  (e) updating or having updated the electronic database based on the transfers to and withdrawals in the plurality of aggregated deposit accounts.

19. The method of claim 18, wherein the withdrawing or having withdrawn step is made from an aggregated deposit account at one of the banks at one of the banking institutions through an aggregated demand deposit account at that bank.

20. The method of claim 19, further comprising selecting the different one of the banks to deposit the additional funds to the aggregated deposit account held thereby based at least on an exclusion of one or more banks made by the client.

21. The method of claim 18, further including the step of, on a regular, periodic, or recurring basis, calculating a net transaction as the sum of individual client deposits and withdrawals from each of the plurality of the client accounts; and, further including the step of utilizing the net transaction calculation to determine an amount of funds that need to be deposited into one or more of the aggregated deposit accounts to cover client deposits, or an amount of funds that needs to be withdrawn from one or more of the aggregated deposit accounts to cover client withdrawals.

22. The method of claim 18, further including the steps of: (a) monitoring requested debits of funds from each of the client accounts, and (b) selectively authorizing or rejecting each of the requested debits based upon an account balance in a client account or a client's proportionate share in the plurality of aggregated deposit accounts or based upon both the account balance in the client account and the client's proportionate share in the plurality of aggregated deposit accounts.

23. The method of claim 18, wherein the withdrawing or having withdrawn step is substantially performed only by one or more of the following methods: in person, or by mail, or by messenger, or by telephone and distributed by mail, or by automated teller machine, or a combination thereof so that the insured and interest-bearing status of the aggregated deposit accounts is preserved.

24. The method of claim 18, further comprising selecting the different one of the banks to deposit the additional funds to the aggregated deposit account held thereby based at least on an exclusion of one or more banks made by the client.

25. The method of claim 18, further comprising selecting the different one of the banking institutions to deposit the excess over the specified amount to the aggregated deposit account held thereby based on an exclusion of one or more banks located in a state where the client resides.

26. The method of claim 18, withdrawing or having withdrawn client funds from the FDIC-insured and interest-bearing aggregated deposit account held at a second one of the banks of a second one of the banking institutions more than six (6) times during a month while preserving an insured and interest-bearing status of the FDIC-insured and interest-bearing aggregated deposit account held at the second one of the banks.

27. A computer-implemented method for managing funds for a plurality of client accounts for a plurality of clients whose funds were accepted for deposit in respective client accounts held in the names of the respective different clients at a first banking institution that includes a first bank in its infrastructure, the method comprising:
(a) accepting client funds from each of a plurality of the clients, with funds from each different client being accepted into a respective client account held in the name of that respective client at the first banking institution;
(b) maintaining or having maintained an FDIC-insured and interest-bearing aggregated deposit account at the first bank in the first banking institution;
(c) maintaining or having maintained or receiving access by computer to an electronic database, on one or more computer-readable media, containing information on funds held by each client in a plurality of FDIC-insured and interest-bearing aggregated deposit accounts, each aggregated deposit account held in a different respective bank of a different respective banking institution;
(d) transferring or have transferred client funds of a plurality of the client accounts to the aggregated deposit account at the first bank except that for clients with a balance of funds in the aggregated deposit account at the first bank that equal or exceed a specified amount depositing or having deposited additional funds of that client to one of the aggregated deposit accounts in one of the different banks in one of the different banking institutions;
(e) withdrawing or having withdrawn client funds from the aggregated deposit account held at one of the banks of one of the banking institutions more than six (6) times during a month while preserving an insured and interest-bearing status of the FDIC-insured and interest-bearing aggregated deposit account held at the one bank; and
(f) updating the electronic database based on the transfers to and withdrawals in the plurality of aggregated deposit accounts or receiving electronic access.

28. The method of claim 27, wherein the withdrawing or having withdrawn step is made from an aggregated deposit account at the first bank through an aggregated demand deposit account at the first bank.

29. The method of claim 28, further comprising receiving one or more exclusions of one of the clients of one or more banks, and using such exclusions to assist in selecting the different one of the banks to deposit the additional funds to the aggregated deposit account held thereby.

30. The method of claim 27, further comprising receiving one or more exclusions of one of the clients of one or more banks, and using such exclusions to assist in selecting the different one of the banks to deposit the additional funds to the aggregated deposit account held thereby.

31. The method of claim 27, further comprising receiving one or more exclusions of one of the clients of one or more banks located in a state where the client resides, and providing such exclusion to assist in selecting the different one of the banks to deposit the additional funds to the aggregated deposit account held thereby.

32. The method of claim 27, further including the step of, on a regular, periodic, or recurring basis, calculating a net transaction as the sum of individual client deposits and withdrawals from each of the plurality of the client accounts; and, further including the step of utilizing the net transaction calculation to determine an amount of funds that need to be deposited into one or more of the aggregated deposit accounts to cover client deposits, or an amount of funds that needs to be withdrawn from one or more of the aggregated deposit accounts to cover client withdrawals.

33. The method of claim 27, wherein the withdrawing or having withdrawn step is substantially performed only by one or more of the following methods: in person, or by mail, or by messenger, or by telephone and distributed by mail, or by automated teller machine, or a combination thereof so that the insured and interest-bearing status of the aggregated deposit account at the first banking institution is preserved.

34. The method of claim 27, withdrawing or having withdrawn client funds from the FDIC-insured and interest-bearing aggregated deposit account held at a second one of the banks of a second one of the banking institutions more than six (6) times during a month while preserving an insured and interest-bearing status of the FDIC-insured and interest-bearing aggregated deposit account held at the second one of the banks.

35. A computer-implemented method for managing funds for a plurality of client accounts for a plurality of clients of a first banking institution that includes a first bank in its infrastructure, wherein the respective client funds were accepted for deposit in respective client accounts held in the names of the respective clients, the method comprising:
(a) maintaining a plurality of FDIC-insured and interest-bearing aggregated deposit accounts, each aggregated deposit account held in a different respective bank of a different respective banking institution including an FDIC-insured and interest-bearing aggregated deposit account held at the first bank in the first banking institution;

(b) maintaining or having maintained an electronic database, on one or more computer-readable media, containing information on funds held by each client in the plurality of aggregated deposit accounts;

(c) administering the aggregated deposit accounts to transfer or have transferred client funds that had been accepted into respective client accounts held in the names of the respective clients at the first banking institution to the aggregated deposit account at the first bank except that for clients with a balance of funds in the aggregated deposit account at the first bank that equal or exceed a specified amount depositing or having deposited additional funds of that client to one of the aggregated deposit accounts in one of the different banks in one of the different banking institutions;

(d) withdrawing or having withdrawn client funds from the FDIC-insured and interest-bearing aggregated deposit account held at one of the banks of one of the banking institutions more than six (6) times during a month while preserving an insured and interest-bearing status of the FDIC-insured and interest-bearing aggregated deposit account held at the one bank; and (e) updating or having updated the electronic database based on the transfers to and withdrawals in the plurality of aggregated deposit accounts.

36. The method of claim 35, wherein the withdrawing or having withdrawn step is made from an aggregated deposit account at one of the banks at one of the banking institutions through an aggregated demand deposit account at that bank.

37. The method of claim 36, further comprising selecting the different one of the banks to deposit the additional funds to the aggregated deposit account held thereby based at least on an exclusion of one or more banks made by the client.

38. The method of claim 35, further including the step of, on a regular, periodic, or recurring basis, calculating a net transaction as the sum of individual client deposits and withdrawals from each of the plurality of the client accounts; and, further including the step of utilizing the net transaction calculation to determine an amount of funds that need to be deposited into one or more of the aggregated deposit accounts to cover client deposits, or an amount of funds that needs to be withdrawn from one or more of the aggregated deposit accounts to cover client withdrawals.

39. The method of claim 35, further including the steps of: (a) monitoring requested debits of funds from each of the client accounts, and (b) selectively authorizing or rejecting each of the requested debits based upon an account balance in a client account or a client's proportionate share in the plurality of aggregated deposit accounts or based upon both the account balance in the client account and the client's proportionate share in the plurality of aggregated deposit accounts.

40. The method of claim 35, wherein the withdrawing or having withdrawn step is substantially performed only by one or more of the following methods: in person, or by mail, or by messenger, or by telephone and distributed by mail, or by automated teller machine, or a combination thereof so that the insured and interest-bearing status of the aggregated deposit accounts is preserved.

41. The method of claim 35, further comprising selecting the different one of the banks to deposit the additional funds to the aggregated deposit account held thereby based at least on an exclusion of one or more banks made by the client.

42. The method of claim 35, further comprising selecting the different one of the banking institutions to deposit the excess over the specified amount to the aggregated deposit account held thereby based on an exclusion of one or more banks located in a state where the client resides.

43. The method of claim 35, withdrawing or having withdrawn client funds from the FDIC-insured and interest-bearing aggregated deposit account held at a second one of the banks of a second one of the banking institutions more than six (6) times during a month while preserving an insured and interest-bearing status of the FDIC-insured and interest-bearing aggregated deposit account held at the second one of the banks.

44. A computer-implemented method for managing funds for a plurality of client accounts for a plurality of clients whose funds were accepted for deposit in respective client accounts held in the names of the respective different clients at a first banking institution that includes a first bank in its infrastructure, the method comprising:

(a) accepting client funds from each of a plurality of the clients, with funds from each different client being accepted into a respective client account held in the name of that respective client at the first banking institution;

(b) maintaining or having maintained an FDIC-insured and interest-bearing aggregated deposit account at the first bank in the first banking institution;

(c) maintaining or having maintained or receiving access by computer to an electronic database, on one or more computer-readable media, containing information on funds held by each client in a plurality of FDIC-insured and interest-bearing aggregated deposit accounts, each aggregated deposit account held in a different respective bank of a different respective banking institution;

(d) transferring or have transferred client funds of a plurality of the client accounts to the aggregated deposit account at the first bank except that for clients with a balance of funds in the aggregated deposit account at the first bank that equal or exceed a specified amount depositing or having deposited additional funds of that client to one of the aggregated deposit accounts in one of the different banks in one of the different banking institutions;

(e) withdrawing or having withdrawn client funds from the aggregated deposit account held at one of the banks of one of the banking institutions more than six (6) times during a month while preserving an insured and interest-bearing status of that aggregated deposit account held at the one bank; and (f) updating the electronic database based on the transfers to and withdrawals in the plurality of aggregated deposit accounts or receiving electronic access.

45. The method of claim 44, wherein the withdrawing or having withdrawn step is made from an aggregated deposit account at the first bank through an aggregated demand deposit account at the first bank.

46. The method of claim 45, further comprising receiving one or more exclusions of one of the clients of one or more banks, and using such exclusions to assist in selecting the different one of the banks to deposit the additional funds to the aggregated deposit account held thereby.

47. The method of claim 44, further comprising receiving one or more exclusions of one of the clients of one or more banks, and using such exclusions to assist in selecting the different one of the banks to deposit the additional funds to the aggregated deposit account held thereby.

48. The method of claim 44, further comprising receiving one or more exclusions of one of the clients of one or more banks located in a state where the client resides, and providing such exclusion to assist in selecting the different one of the banks to deposit the additional funds to the aggregated deposit account held thereby.

49. The method of claim 44, further including the step of, on a regular, periodic, or recurring basis, calculating a net transaction as the sum of individual client deposits and withdrawals from each of the plurality of the client accounts; and, further including the step of utilizing the net transaction calculation to determine an amount of funds that need to be deposited into one or more of the aggregated deposit accounts to cover client deposits, or an amount of funds that needs to be withdrawn from one or more of the aggregated deposit accounts to cover client withdrawals.

50. The method of claim 44, wherein the withdrawing or having withdrawn step is substantially performed only by one or more of the following methods: in person, or by mail, or by messenger, or by telephone and distributed by mail, or by automated teller machine, or a combination thereof so that the insured and interest-bearing status of the aggregated deposit account at the first banking institution is preserved.

51. The method of claim 44, withdrawing or having withdrawn client funds from the FDIC-insured and interest-bearing aggregated deposit account held at a second one of the banks of a second one of the banking institutions more than six (6) times during a month while preserving an insured and interest-bearing status of the FDIC-insured and interest-bearing aggregated deposit account held at the second one of the banks.

* * * * *